US012706388B2

(12) United States Patent
Zhao et al.

(10) Patent No.: US 12,706,388 B2
(45) Date of Patent: Aug. 11, 2026

(54) MULTI-LAYER FREQUENCY-SELECTIVE SURFACE

(71) Applicant: Sony Group Corporation, Tokyo (JP)

(72) Inventors: Kun Zhao, Malmö (SE); Fredrik Rusek, Eslöv (SE); Olof Zander, Södra Sandby (SE); Erik Bengtsson, Eslöv (SE); Jose Flordelis, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/290,217

(22) PCT Filed: May 12, 2022

(86) PCT No.: PCT/EP2022/062917

§ 371 (c)(1),
(2) Date: Nov. 10, 2023

(87) PCT Pub. No.: WO2022/253545

PCT Pub. Date: Dec. 8, 2022

(65) Prior Publication Data

US 2024/0266748 A1 Aug. 8, 2024

(30) Foreign Application Priority Data

Jun. 2, 2021 (SE) .................................... 2150704-1

(51) Int. Cl.
*H01Q 15/00* (2006.01)
*H01Q 1/42* (2006.01)

(52) U.S. Cl.
CPC ............. *H01Q 15/002* (2013.01); *H01Q 1/42* (2013.01); *H01Q 15/0026* (2013.01)

(58) Field of Classification Search
CPC .... H01Q 15/002; H01Q 1/42; H01Q 15/0026; H01Q 1/422
See application file for complete search history.

(56) References Cited

U.S. PATENT DOCUMENTS

| | | | | |
|---|---|---|---|---|
| 5,579,024 | A | 11/1996 | Sureau | |
| 9,735,885 | B1 * | 8/2017 | Sayyah | G02F 1/292 |
| 11,532,870 | B2 * | 12/2022 | Jia | H05K 5/0086 |
| 2009/0273527 | A1 | 11/2009 | Behdad | |
| 2019/0158130 | A1 | 5/2019 | Achour | |
| 2020/0136234 | A1 * | 4/2020 | Paulotto | H01Q 15/0026 |

(Continued)

FOREIGN PATENT DOCUMENTS

| | | | |
|---|---|---|---|
| CN | 105846017 | A | 8/2016 |
| CN | 108767487 | A | 11/2018 |
| CN | 109449601 | A | 3/2019 |

(Continued)

OTHER PUBLICATIONS

S. Henthorn, K. L. Ford and T. OâFarrell, “Direct Antenna Modulation for High-Order Phase Shift Keying,” in IEEE Transactions on Antennas and Propagation, vol. 68, No. 1, pp. 111-120, Jan. 2020, doi: 10.1109/TAP.2019.2935136 (Year: 2020).*

(Continued)

*Primary Examiner* — Dimary S Lopez Cruz
*Assistant Examiner* — Austin M Back
(74) *Attorney, Agent, or Firm* — Tucker Ellis LLP

(57) ABSTRACT

A multi-layer frequency selective surface is disclosed that exhibits a frequency response having a passband and one or more stopbands.

14 Claims, 14 Drawing Sheets

(56) References Cited

U.S. PATENT DOCUMENTS

| | | | | |
|---|---|---|---|---|
| 2023/0040927 | A1 * | 2/2023 | Kim | H01Q 5/385 |

FOREIGN PATENT DOCUMENTS

| | | | | | |
|---|---|---|---|---|---|
| CN | 110994172 | A * | 4/2020 | | H01Q 1/42 |
| CN | 111817023 | A | 10/2020 | | |
| CN | 112234363 | A | 1/2021 | | |
| CN | 112736481 | A * | 4/2021 | | H01Q 15/0026 |
| EP | 3761450 | A1 | 1/2021 | | |
| JP | S56137703 | A | 10/1981 | | |
| JP | S57132401 | A | 8/1982 | | |
| JP | 2009033324 | A | 2/2009 | | |
| WO | WO-2018011294 | A1 * | 1/2018 | | H01Q 15/002 |

OTHER PUBLICATIONS

Ayan Chatterjee et al., "A triple-layer dual-bandpass frequency selective surface of third order response with equivalent circuit analysis," International Journal of RF and Microwave Computer-Aided Engineering, Oct. 26, 2019, 7 pages.

Amir Ebrahimi et al., "Varactor-Tunable Second-Order Bandpass Frequency-Selective Surface With Embedded Bias Network," IEEE Transactions on Antennas and Propagation, vol. 64, No. 5, May 16, 2016, 9 pages.

Farhad Bayatpur et al., "Design and Analysis of a Tunable Miniaturized-Element Frequency-Selective Surface Without Bias Network," IEEE Transactions on Antennas and Propagation, vol. 58, No. 4, Apr. 4, 2010, 6 pages.

Stephen Henthorn et al., "Direct Antenna Modulation for High-Order Phase Shift Keying," IEEE Transactions on Antennas and Propagation, vol. 68, No. 1, Jan. 2020, 10 pages.

Renzhi Huang et al., "Varactor-tunable Bandpass Frequency Selective Surface with Wide Tuning Range", 2020 9th Asia-Pacific Conference on Antennas and Propagation (APCAP), Aug. 4, 2020, 2 pages.

Mudar Al-Joumayly et al., "A New Technique for Design of Low-Profile, Second-Order, Bandpass Frequency Selective Surfaces," IEEE Transactions on Antennas and Propagation, vol. 57, No. 2, Feb. 2009, 8 pages.

Rana Sadaf Anwar et al., "Frequency Selective Surfaces: A Review," Applied Sciences, vol. 8, 1689, Sep. 18, 2018, 46 pages.

International Search Report and Written Opinion from corresponding International Application No. PCT/EP2022/062917, mailed on Sep. 5, 2022, 14 pages.

Office Action and Swedish Search Report from corresponding Swedish Application No. 2150704-1, mailed on Feb. 18, 2022, 11 pages.

Chang, Kihun et al., "Equivalent Circuit Modeling of Active Frequency Selective Surfaces." 2008 IEEE Radio and Wireless Symposium. IEEE, 2008, 4 pgs.

* cited by examiner

MULTI-LAYER FREQUENCY-SELECTIVE SURFACE

TECHNICAL FIELD

Various examples of the disclosure are broadly concerned with frequency-selective surfaces (FSSs) including multiple layers. Various examples of the disclosure are specifically concerned with a unit-cell geometry of an array of a middle layer of the FSS facilitating flexible positioning of a stopband in the frequency domain.

BACKGROUND

Glass is a widely used material for housings of mobile phones. However, glass can have a significant impact on the propagation properties of electromagnetic waves, in particular in the millimeter wavelength regime. This is because glass has a high permittivity. For instance, the permittivity (relative to the permittivity of vacuum) of glass can be between 5.5 and 7 which can be twice as large if compared to plastic. Plastic can typically have a permittivity below 3.0.

Thus, glass can significantly block electromagnetic waves used for communication purposes. For instance, it has been observed that for electromagnetic waves having a frequency of 28 GHz, transmission can be completely blocked at certain incident angles.

To improve the transmissivity, FSSs can be used. FSSs are disclosed in:

Anwar, Rana Sadaf, Lingfeng Mao, and Huansheng Ning. "FSSs: a review." *Applied Sciences* 8.9 (2018): 1689.

Chang, Kihun, Sang il Kwak, and Young Joong Yoon. "Equivalent circuit modeling of active FSSs." 2008 *IEEE Radio and Wireless Symposium*. IEEE, 2008.

Bayatpur, Farhad, and Kamal Sarabandi. "Tuning performance of metamaterial-based FSSs." *IEEE Transactions on Antennas and Propagation* 57.2 (2009): 590-592.

Al-Joumayly, Mudar, and Nader Behdad. "A new technique for design of low-profile, second-order, bandpass FSSs." *IEEE Transactions on Antennas and Propagation* 57.2 (2009): 452-459.

SUMMARY

A need exists for advanced FSSs. In particular, a need exists for FSSs that exhibit a stopband. A need exists for FSSs that enable tailoring of a frequency of the stopband.

This need is met by the features of the independent claims. The features of the dependent claims define examples.

Hereinafter, techniques are disclosed of implementing an FSS that can enable a good transmission in desired frequency bands (passbands), as well as one more stopbands where the transmissivity of electromagnetic waves is low.

According to various examples, a multi-layer FSS (MFSS) includes a first layer including a first array of first metallic elements. The MFSS also includes a second layer that includes a second array of second metallic elements. Adjacent ones of the second metallic elements are distanced by gaps from each other. The MFSS also includes a third layer that includes a third array of third metallic elements. The second layer is arranged in between and adjacent to the first layer and the third layer.

The second layer being arranged in between and adjacent to the first layer and the third layer can mean that no further metallic elements are in between the second layer and the first layer, as well as in between the second layer and the third layer, respectively.

Accordingly, the first layer may be labeled top layer the third layer may be labeled bottom layer and the second layer may be labeled middle layer.

The metallic elements being distanced by gaps can mean that the width of the respective metallic elements is smaller than a periodicity of the metallic elements in the second array. Thus, the gap is formed.

The arrays can be planar and parallel to each other.

The first array and the third array can be the same.

The two orthogonal directions in-plane of the arrays are referred to as X-direction and Y-direction hereinafter.

It would be possible that the multi-layer FSS includes further layers at the top and/or bottom of the layer stack formed by the first layer, the second layer, and the third layer.

The first metallic elements may be first capacitive metallic elements. Alternatively or additionally, the second metallic elements may be second capacitive metallic elements. Alternatively or additionally, the third metallic elements may be third capacitive metallic elements.

Capacitive metallic elements can be elements that exhibit a significant capacitance in an equivalent circuit model for modeling the response to incident electromagnetic waves. Thus, the capacitive metallic elements may be different to a continuous metal sheet. The capacitive metallic elements may be separated by gaps from each other.

In particular, capacitive metallic elements may be different from inductive metallic elements, e.g., wire strips, that primarily provide an inductance to incident electromagnetic waves. Capacitive metallic elements can introduce a phase lead or lag to incident electromagnetic waves.

It has been observed that MFSSs as described above can have a frequency response that includes, both, a passband and a stopband. In various applications, it can be desirable to implement, both, the passband, as well as the stopband. This is because thereby a frequency filter can be implemented and interference and/or electromagnetic exposure can be mitigated while transmittivity for electromagnetic waves in the desired communication spectrum can be supported.

The formation of the stopband can be motivated by the presence of the gaps in between the adjacent ones of the second metallic elements in the middle layer. Such gaps would correspond to an additional parallel capacitance in an equivalent circuit model of the MFSS, the equivalent circuit model corresponding to a Pi-filter, see, e.g., Al-Joumayly, Mudar, and Nader Behdad. "A new technique for design of low-profile, second-order, bandpass FSSs." *IEEE Transactions on Antennas and Propagation* 57.2 (2009): 452-459.

In particular, the transmissivity of the passband, i.e., the fraction of electromagnetic energy that is able to pass through the MFSS relative to the electromagnetic energy incident on the MFSS, can be close to 1, e.g., in the range of 0.9 to 1. The transmissivity of the stopband, on the other hand, can be less than 10%, or even less than $E10^{-4}$.

As a general rule, the stopband may be offset from the passband in the frequency domain. This means that the passband and the stopband may be arranged at different frequencies.

As a general rule, the stopband can be at higher frequencies than the passband or at lower frequencies.

It would be possible that the frequency response of the MFSS includes multiple passbands. For instance, a first passband may be at lower frequencies when compared to the stopband and a second passband may be at higher frequencies when compared to the stopband.

It would be possible that the frequency response of the MFSS includes multiple stopbands. For instance, a first stopband may be located at lower frequencies than the passband and a second stopband may be located at higher frequencies than the passband.

By using the MFSSs having the second array with gaps in between adjacent metallic elements, it is possible to flexibly tailor the frequency of the stopband and the frequency of the passband. In particular, a frequency of the stopband can be shifted without significantly shifting a frequency of the passband, and vice versa. This is because the frequency of the stopband is mainly affected by the gaps in the second array; while the frequency of the passband is mainly affected by the geometry of the first and third arrays.

As a general rule, it would be possible that a metal filling fraction is lower for the second array than for the first array and the third array. The metal filling fraction can describe the ratio between the area covered by metal compared to the total area covered by the respective array. For instance, a continuous metal layer would have a metal filling fraction of 1. A dielectric layer would have a metal filling fraction of 0.

By using a comparably low metal filling fraction for the middle layer, it is possible to facilitate formation of the passband.

As a general rule, various options are available for implementing the metallic elements of the middle layer. For instance, the metallic elements of the middle layer could be loop-shaped or cross-shaped.

In some examples, the second array has a twofold rotational symmetry. The twofold rotational symmetry would describe a scenario in which a 180° rotation of the geometry of metallic elements around a rotation axis perpendicular to the plane of the second array results in the initial geometry. I.e., this corresponds to mirroring the geometry at an in-plane axis of array.

Such twofold symmetry would have multiple implications. First, different widths could be used for gaps in X-direction and Y-direction (otherwise, if the same gaps were used for X and Y direction, this would result in a fourfold or higher rotational symmetry.) This means that horizontal and vertical polarization ("horizontal" and "vertical" are arbitrarily defined) of electromagnetic waves are affected differently by the MFSS. Thereby, it would be, in particular, possible to tune different stopbands for the horizontally and vertically polarized signals. This can be helpful to mitigate interference where polarization multiplexing is used.

Thus, as a general rule, adjacent ones of the second metallic elements can be distanced from each other by first gaps along a first in-plane direction (e.g., X-direction) of the second array—while adjacent ones of the second metallic elements can be distanced from each other by second gaps along a second in-plane direction (e.g., Y-direction) of the second array.

As a general rule, the first gaps can be configured the same as the second gaps or can be configured differently. For instance, the first gaps could be wider.

Adjacent ones of the second metallic elements could even be joined together—i.e., no gap—along a second in-plane direction of the second array.

All such different configurations can enable tailoring the stopband differently for the different polarizations of the electromagnetic waves.

According to various examples, it would be possible that tunable capacitors are arranged in one or more of the gaps between the adjacent metallic elements of the second layer.

For instance, the tunable capacitors could be implemented using PIN diodes. The tunable capacitors could be implemented using voltage-controlled capacitors.

Typically, PIN diodes can be switched between two states, i.e., on or off which results in two equivalent capacitances, e.g., when operated in reverse bias. Thereby, it would be possible to switch on/switch off the stopband. Differently, tunable capacitors can exhibit a tunable capacitance. Thereby, it would also be possible to change a frequency of the stopband by tuning the capacitance of the tunable capacitors.

According to various examples, a system can include such MFSS as disclosed above. Additionally, the system can include a voltage source that is configured to apply a bias voltage to the tunable capacitors. A control unit can be configured to control the voltage source to apply the bias voltage.

The control unit—e.g., including a processor and a memory storing program code that can be loaded and executed by the processor—can be configured to control the voltage source to apply the bias voltage based on control data that is indicative of a frequency of the stopband.

As a general rule, a voltage source that is configured to apply the bias voltage to the tunable capacitors, to tune the frequency of the stopband, can do so using a series connection of multiple ones of the tunable capacitors. Then, it is not required to individually bias each individual tunable capacitor, but rather by exploiting the series connection a simplified supply network can be achieved.

A wireless communication device includes a cover and an antenna. The antenna is configured to transmit or receive electromagnetic waves. The MFSS as disclosed above can be attached to the glass cover adjacent to the antenna. A frequency of a passband can be tuned to a frequency of the antenna.

The cover can be made from a high permittivity material, e.g., having a permittivity of not less than 4 or not less than 5.

For example, the cover can be made from glass.

A computer-implemented method includes obtaining control data that is indicative of a frequency. Then, a voltage source can be controlled to bias tunable capacitors arranged in gaps between elements of an array of an MFSS.

It is to be understood that the features mentioned above and those yet to be explained below may be used not only in the respective combinations indicated, but also in other combinations or in isolation without departing from the scope of the invention.

DETAILED DESCRIPTION

Figure 1:
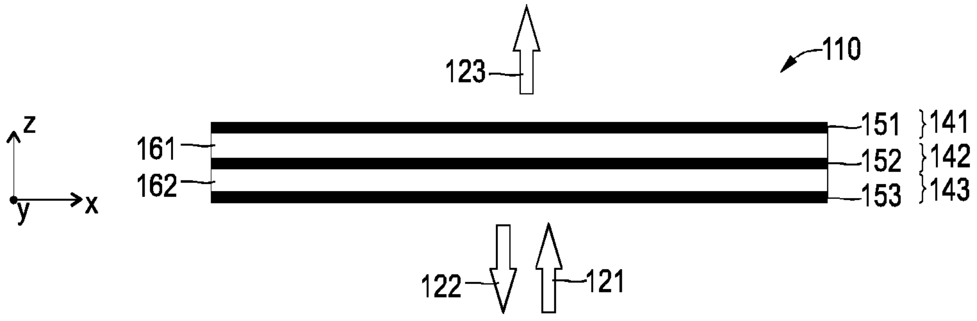
FIG. 1 is a schematic side view of an MFSS according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the invention will be described in detail with reference to the accompanying drawings. It is to be understood that the following description of examples is not to be taken in a limiting sense. The scope of the invention is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques associated with FSSs will be disclosed. An FSS is a passive device or semi-passive that exhibits an (adjustable) electrical response. To tailor the frequency-selective transmission/reflection characteristics of the FSS, a planar and periodic array of metallic elements may be used. A thickness of a corresponding layer may be negligible if compared to the wavelength. However, the thickness of the layer can be larger than the skin depth of the metal. Thus, such array of metallic elements can be approximated as an array of perfectly conducting resonant elements. A periodicity of the metallic elements in the respective array may be on the same order of magnitude as the wavelength, or even smaller.

According to various examples, an MFSS is used. Here, a bottom layer, a top layer and a middle layer arranged in between the top layer and the bottom layer are used.

According to various examples, a tunable MFSS is disclosed. Here, tunable capacitors can be used to adjust a frequency response of the MFSS. In particular, the frequency of a stopband of the MFSS can be adjusted by applying an appropriate bias voltage to the tunable capacitors. For example, voltage-controlled capacitors could be used or a PIN diode.

An MFSS according to the disclosed examples can include a stopband in its frequency response. The stopband can help to reduce interference. Out-of-band emissions can be reduced which limits exposure of adjacent biological matter to electromagnetic waves.

According to various examples, MFSSs disclosed herein can have a tailored frequency of the stopband. Firstly, a degree of freedom of design parameters of the geometrical structures used to implement the MFSS can be sufficiently large so as to enable flexible adjustment of the frequency of the stopband without impact on the frequency of an adjacent passband. For instance, the frequency of the stopband may be tuned by the choice of one or more of the following design parameters of the array of metallic elements of the middle layer: shape of the metallic elements; width to periodicity ratio of the metallic elements; gaps between the metallic elements. Change of such parameters may not or only negligibly affect the frequency of the passband. Furthermore, for tunable FSSs, it is possible to dynamically tune the frequency of the stopband without affecting the frequency of the passband.

According to techniques disclosed herein, it is possible to implement multiple stopbands at different frequencies for horizontal and vertical polarizations of the electromagnetic waves. For instance, a twofold rotational symmetry of the array of metallic elements of the middle layer may result in different stopbands for the two polarizations. The twofold symmetry can be achieved by using, e.g., different gap widths for gaps along X-direction and Y-direction of that array.

FIG. 1 schematically illustrates an MFSS 110. The MFSS 110 includes a top layer 141, a middle layer 142, and a bottom layer 143 ("top" and "bottom" are arbitrarily defined). The top layer 141 includes an array 151 of metallic elements. The middle layer 142 includes an array 152 of metallic elements. The bottom layer 143 includes an array 153 of metallic elements. The arrays 151, 152 are separated by a dielectric layer 161. The arrays 152, 153 are separated by a dielectric layer 162.

Illustrated in FIG. 1 are incident electromagnetic waves 121, reflected electromagnetic waves 122, as well as transmitted electromagnetic waves 123. A ratio of the energy or amplitude of the transmitted electromagnetic waves 123 to the energy or amplitude of the incident electromagnetic waves 121 defines a transmissivity of the MFSS. A ratio of the amplitude or energy of the reflected electromagnetic waves 122 to the energy or amplitude of the incident electromagnetic waves 121 defines a reflectivity of the MFSS.

Figure 2:
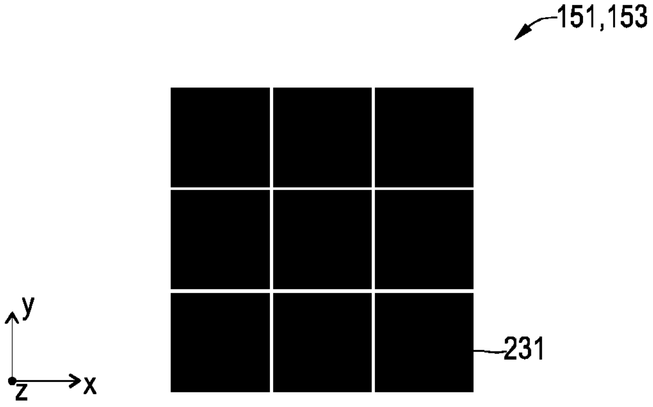
FIG. 2 schematically illustrates an array of metallic elements of a top layer and a bottom layer of the MFSS according to various examples.

FIG. 2 schematically illustrates an example implementation of the arrays 151, 153 of the top layer 141 and the bottom layer 143. For instance, it would be possible that the array 151 is configured the same as the array 153. In the example of FIG. 2, the arrays 151, 153 are implemented by capacitive patches as metallic elements 231, separated by gaps along X-direction and Y-direction.

The arrays 151, 153 have fourfold rotational symmetry in the illustrated example. Thus, a passband position for horizontally and vertically polarized electromagnetic waves would be the same.

It would also be possible to use different gap widths in X-direction and Y-direction, e.g., resulting in twofold rotational symmetry. Then different passbands can be configured for horizontally and vertically polarized electromagnetic waves.

Figure 3:
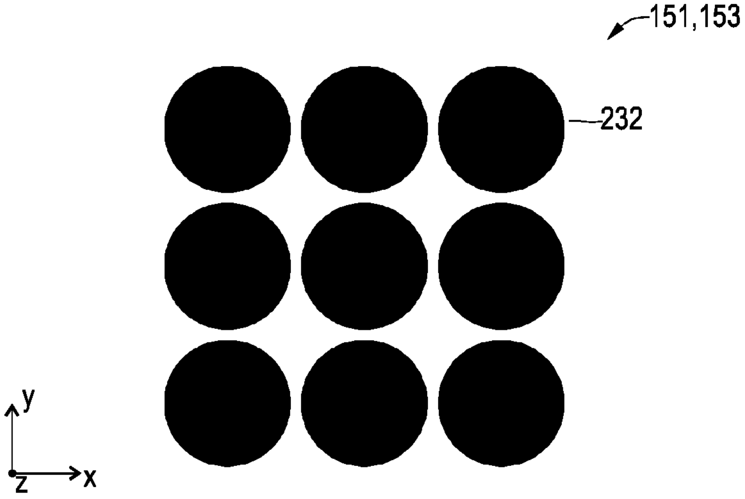
FIG. 3 schematically illustrates an array of metallic elements of a top layer and a bottom layer of the MFSS according to various examples.

FIG. 3 schematically illustrates an example implementation of the arrays 151, 153 of the top layer 141 and the bottom layer 143. The arrays 151, 153 are implemented by capacitive circles as metallic elements 232 (forming the unit cell of the arrays 151, 153). The arrays 151, 153 again have a fourfold rotational symmetry, which is generally optional.

As will be appreciated, in FIG. 2 and FIG. 3, the metallic filling fraction of the arrays 151, 153 is comparably high, e.g., higher than 95% for FIG. 2 and higher than 70% for FIG. 3.

Figure 4:
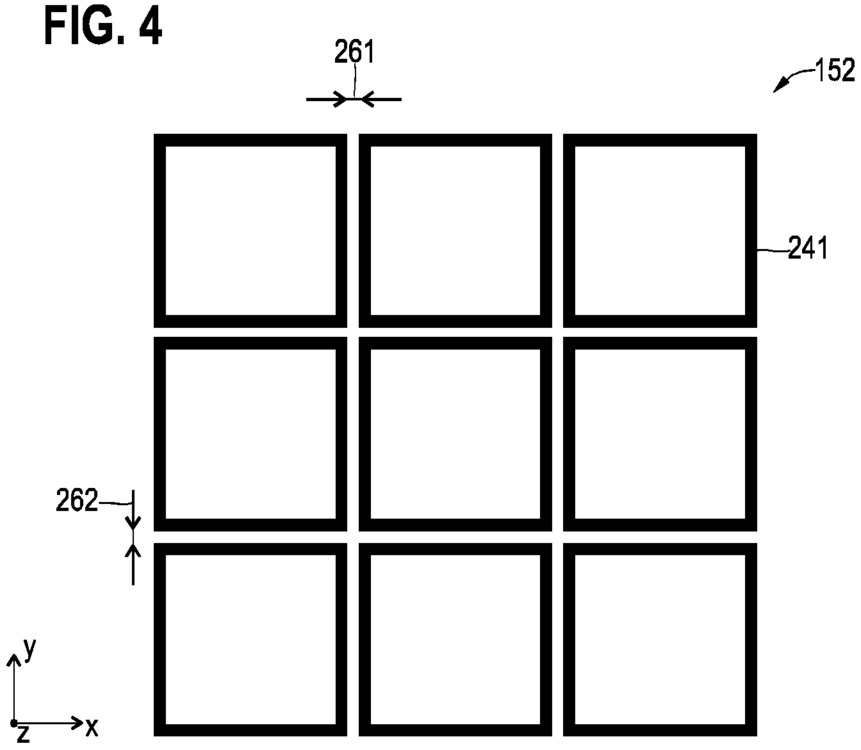
FIG. 4 schematically illustrates an array of metallic elements of a middle layer of the MFSS according to various examples.

FIG. 4 schematically illustrates an example implementation of the array 152 of the middle layer 142. In the example of FIG. 4, the array 152 is implemented by square loop-shaped metallic elements 241 separated by gaps 261, 262 along both X-direction, as well as Y-direction (thereby forming the unit cell of the arrays 151, 153).

The metal filling fraction of the array 152 is less than 15%. This is, in particular, significantly smaller than the metal filling fraction of the arrays 151, 153 of the top layer 141 and the bottom layer 143 discussed in connection with FIG. 2 and FIG. 3 above.

Such difference in the metal filling fraction enables accurate modelling of the frequency response of the MFSS using an equivalent circuit model in the form of a Pi-filter network.

Figure 5:
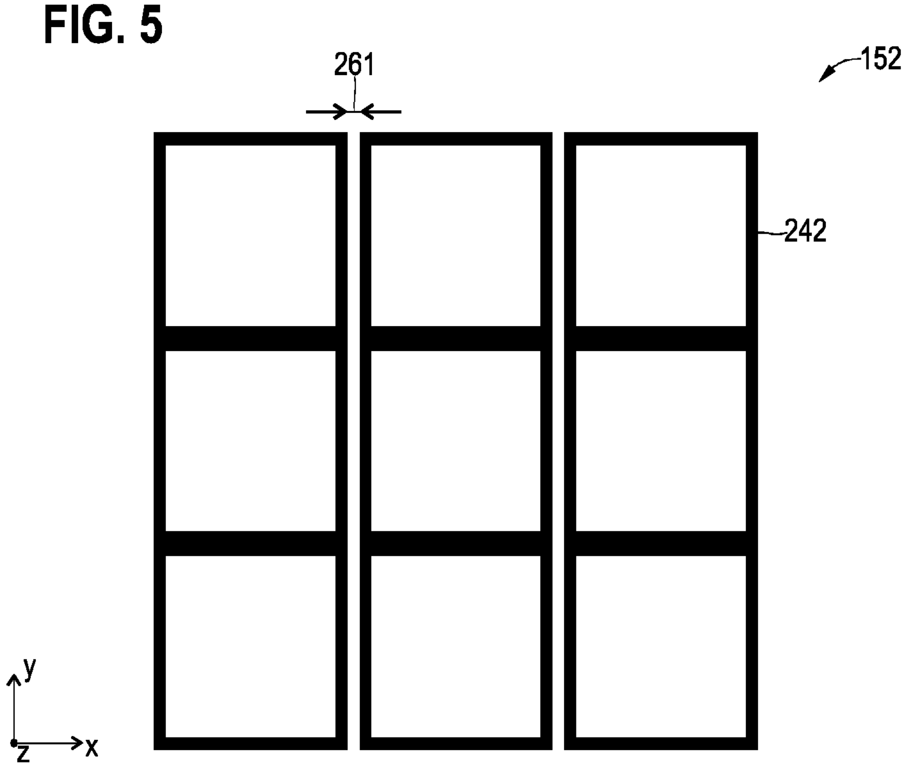
FIG. 5 schematically illustrates an array of metallic elements of a middle layer of the MFSS according to various examples.

FIG. 5 schematically illustrates an example implementation of the array 152 of the middle layer 142. In the example of FIG. 5, the array 152 is implemented using rectangular loop-shaped elements (forming the unit cell of the array 152).

These elements are only distanced/separated by the gaps 261 along the X-direction—and joined together along the Y-direction.

Accordingly, a two-fold rotational symmetry of the array 152 is implemented.

Accordingly, horizontally polarized electromagnetic waves will be affected differently compared to vertically polarized electromagnetic waves. For example, one of the two polarizations can experience a significant stopband, where the stopband may not be present or may not be pronounced in the frequency response for the other polarization.

Figure 6:
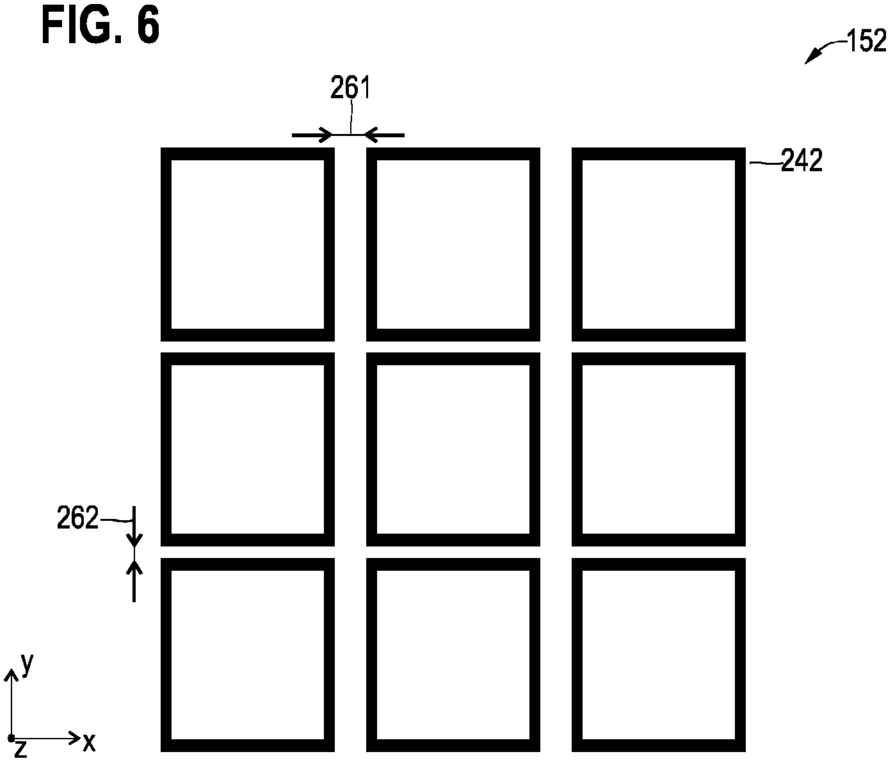
FIG. 6 schematically illustrates an array of metallic elements of a middle layer of the MFSS according to various examples.

FIG. 6 schematically illustrates an example implementation of the array 152 of the middle layer 142. In the example of FIG. 6, the array 152 is implemented using rectangular loop-shaped metallic elements 242 (forming the unit cell of the array 152). These elements are separated by the gaps 261 along X-direction and separated by the gaps 262 along the Y-direction.

The gaps 261, 262 have different widths (the gaps 261 are wider), which is different to the scenario of FIG. 4.

Accordingly, the frequency of stopband for the horizontally polarized electromagnetic waves is different to the frequency of the stopband for the vertically polarized electromagnetic waves.

Figure 7:
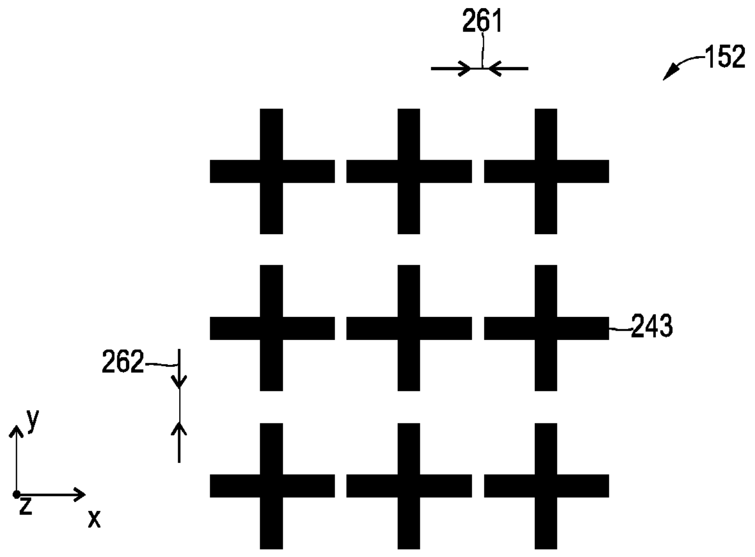
FIG. 7 schematically illustrates an array of metallic elements of a middle layer of the MFSS according to various examples.

FIG. 7 schematically illustrates an example implementation of the array 152 of the middle layer 142. In the example of FIG. 7, the array 152 is implemented using cross-shaped metallic elements 243 (forming the unit cell of the array 152). Again, different widths of the gaps 261, 262 are used, which is generally optional. It would also be possible that the crosses are joined together along Y-direction (not shown).

Figure 8:
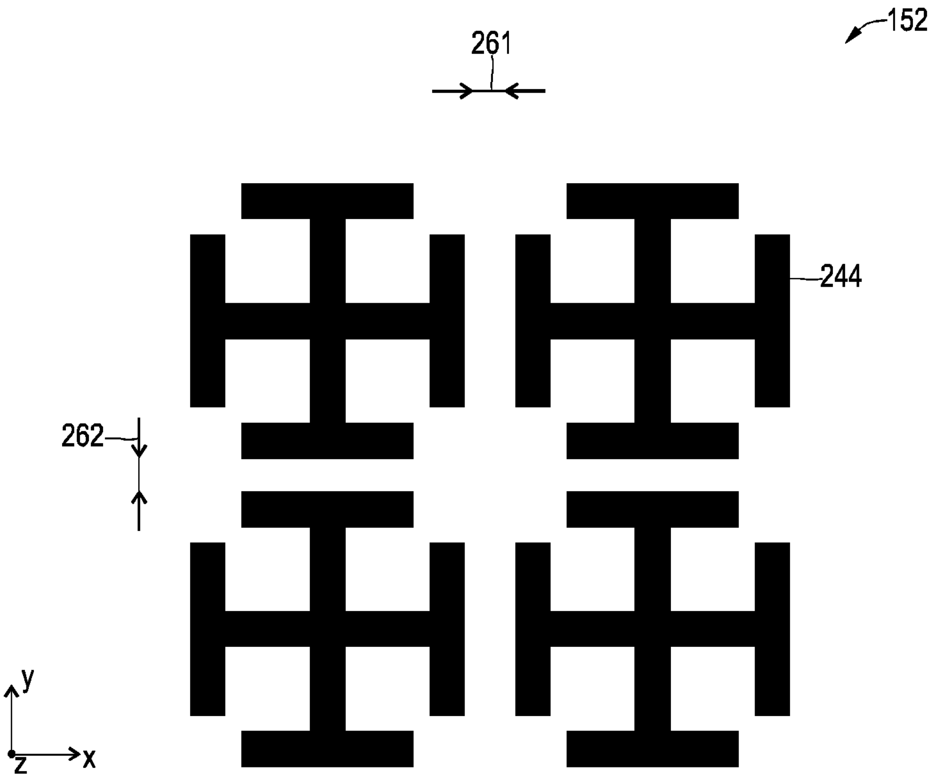
FIG. 8 schematically illustrates an array of metallic elements of a middle layer of the MFSS according to various examples.

FIG. 8 schematically illustrates an example implementation of the array 152 of the middle layer 142. In the example of FIG. 8, the array 152 is implemented using Jerusalem crosses as metallic elements 244 (forming the unit cell of the array 152).

It would be possible that gaps 261, 262 of different widths are used. The crosses could be joined together along Y-direction.

The examples as illustrated above implement a two-fold (FIG. 5, FIG. 6, FIG. 7) or four-fold (FIG. 4, FIG. 8) rotational symmetry for the array 152. Also, a higher-order rotational symmetry would be possible, as illustrated in connection with FIG. 9 (where a six-fold rotational symmetry is shown).

Figure 9:
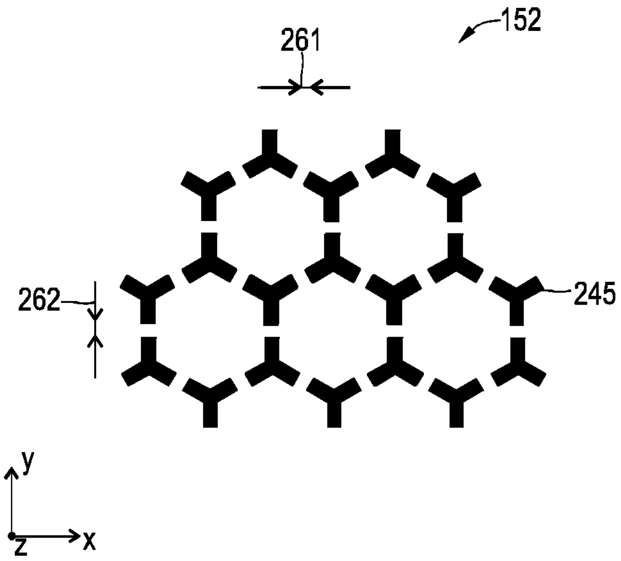
FIG. 9 schematically illustrates an array of metallic elements of a middle layer of the MFSS according to various examples.

FIG. 9 schematically illustrates an example implementation of the array 152 of the middle layer 142. In the example of FIG. 9, the array 152 is implemented using a hexagonal unit cell, sometimes referred to as "3-legged loaded". Again, cross-shaped metallic elements 245 are used, having three legs. A unit cell results that includes multiple such three-legged crosses.

Figure 10:
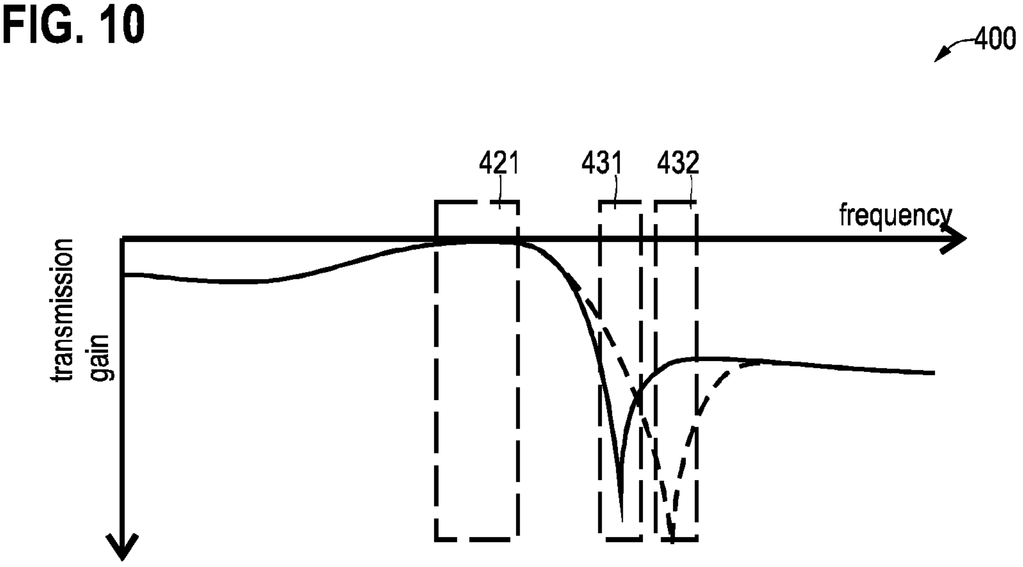
FIG. 10 is a frequency response of the MFSS including a passband and a stopband according to various examples.

FIG. 10 illustrates a frequency response 400 of an MFSS 110 according to various examples. A transmission gain is plotted as a function of frequency. The transmission gain corresponds to the transmissivity. Illustrated is a passband 421 and two stopbands 431, 432 for horizontal polarization and vertical polarization, respectively.

Figure 11:
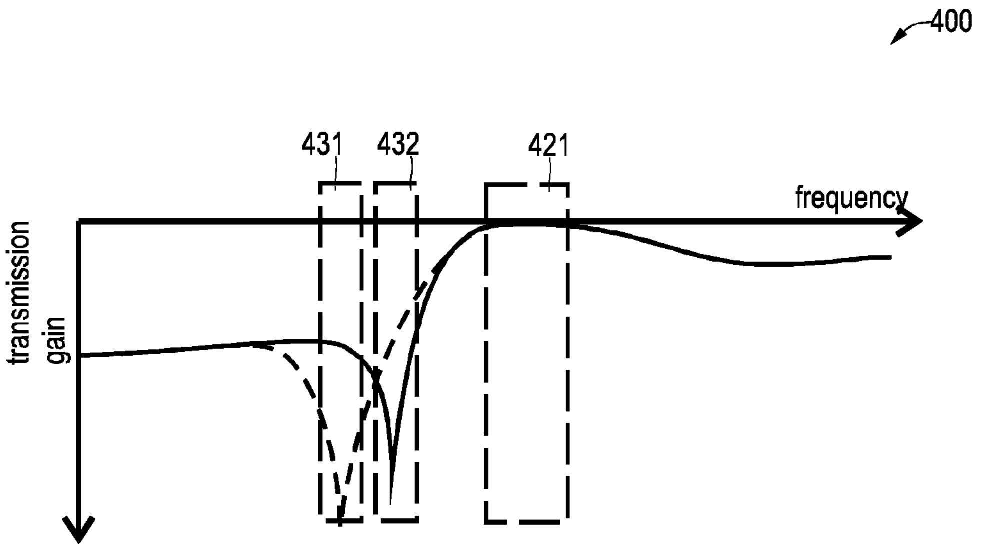
FIG. 11 is a frequency response of the MFSS including a passband and a stopband according to various examples.

While in FIG. 9 the stopbands 431, 432 are arranged above the passband 421, as a general rule, it would be possible that the one or stopbands are also arranged below the passband 421, as illustrated in FIG. 11.

Figure 12:
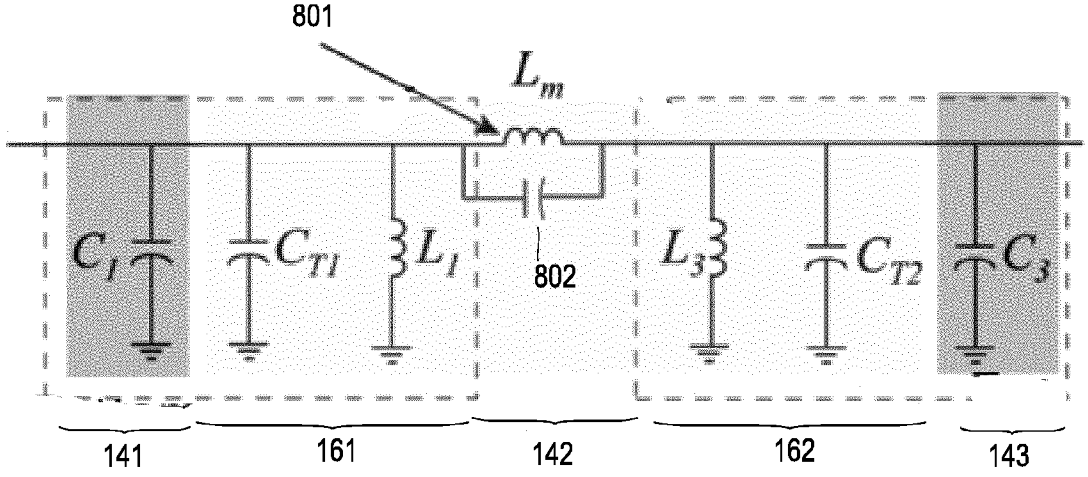
FIG. 12 is an equivalent circuit model of the MFSS according to various examples.

FIG. 12 illustrates an equivalent circuit model 800 of the MFSS. A Pi-filter passive network is implemented. As illustrated, the top layer 141 and the bottom layer 143 are modeled using parallel capacitances (accordingly, the metallic elements 231, 232 can be labeled capacitive metallic elements). The middle layer 142 is modeled by an inductance 801, as well as a capacitance 802 (accordingly, the metallic elements 241-245 can be labeled capacitive metallic elements).

It has been observed that the capacitance 802 is mainly affected by the width of the gaps 261, 262 in-between adjacent metallic elements 241-245 of the middle layer 142. Also, the capacitance 802 affects the frequency of the respective stopband 431, 432. Thus, by tuning the width of the gaps 261, 262, it is possible to tune the frequency of the respective stopband 431, 432.

Figure 13:
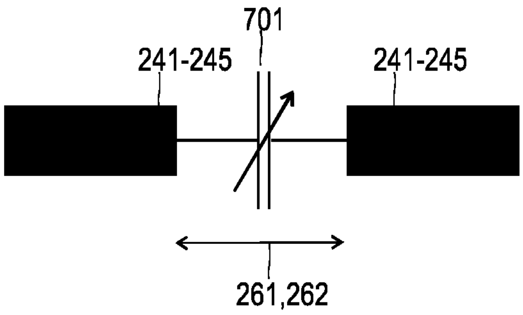
FIG. 13 schematically illustrates a tunable capacitor arranged in the gap between metallic elements of a middle layer of the MESS according to various examples.

To be able to tailor the frequency of the stopbands 431, 432 even more flexibly, it would be possible to arrange a tunable capacitor 701 in one or more of the gaps 261, 262, as illustrated in FIG. 13. For instance, the tunable capacitor 701 could be implemented as a PIN diode or a voltage-controlled capacitor.

Figure 14:
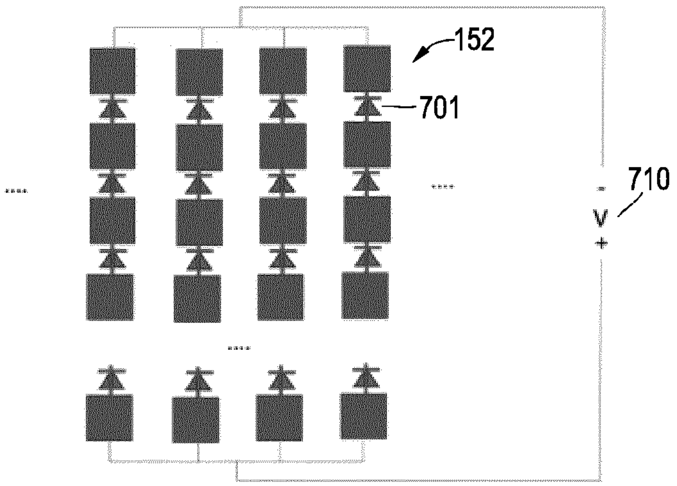
FIG. 14 schematically illustrates biasing the tunable capacitors according to various examples.

FIG. 14 schematically illustrates a voltage source 710 applying a bias voltage to a series connection of the tunable capacitors 701 (varactors) arranged in adjacent gaps 261, 262 of the array 152. This simplifies the electrical supply network. While in FIG. 14 the tunable capacitors 701 are illustrated as PIN diodes, other implementations would be similarly possible, e.g., using varactors.

Figure 15:
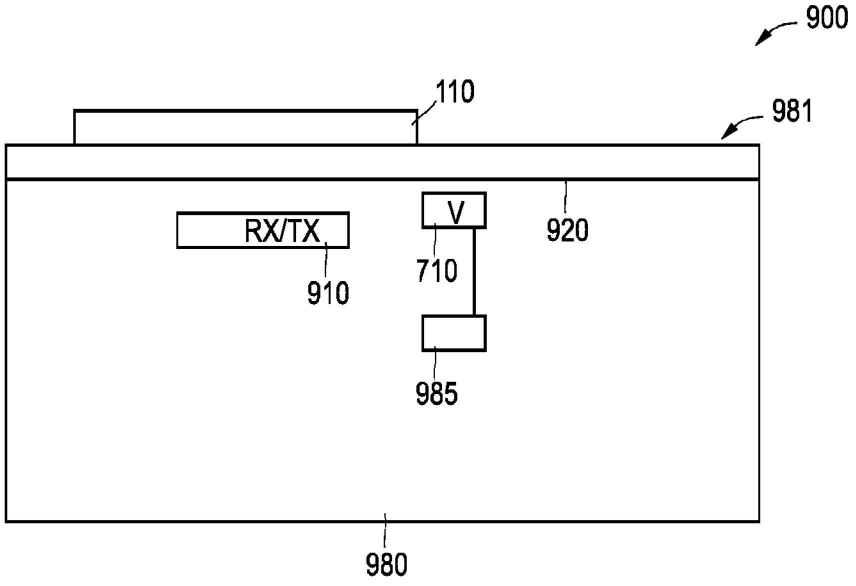
FIG. 15 schematically illustrates a system including the MFSS attached to a cover of a housing of a wireless communication device.

FIG. 15 schematically illustrates a system 900. The system 900 includes a housing 980 of a wireless communication device 981, e.g., a tablet or a mobile phone. A glass cover 920 is used. Generally, a cover made from a high permittivity material having a permittivity of not less than 4 or 5 could be used. An MFSS 110 is attached to the glass cover 920 in an area adjacent to an antenna 910. A frequency of one or more passbands of the MFSS is matched to a frequency of the antenna 910.

A control unit 985 is provided that can control a voltage source 710 to apply a voltage to the tunable capacitors 701 (not illustrated in FIG. 15). For instance, this can be based on control data that is indicative of a frequency of a desired stopband.

Figure 16:
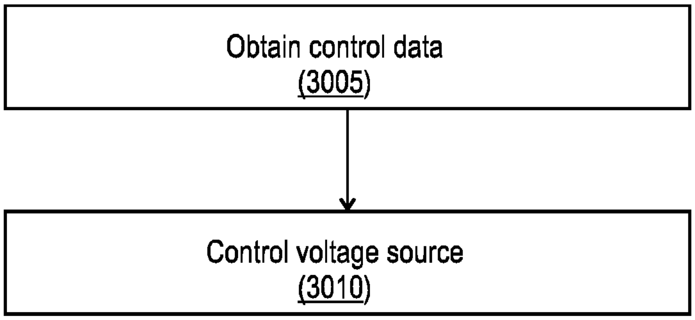
FIG. 16 is a flowchart of a method according to various examples.

FIG. 16 is a flowchart of a method according to various examples. For instance, the method of FIG. 16 could be executed by the control unit 985 or another processor. A voltage source coupled with tunable capacitors arranged in gaps 261, 262 as discussed above can be controlled.

At box 3005, control data is obtained that is indicative of a frequency of a stopband. The control data could be loaded from a memory.

At box 3010 a voltage source can be controlled to apply a voltage to the tunable capacitors that are arranged in gaps between adjacent metallic elements of a respective array of a MFSS, e.g., as discussed in connection with the FIGS. above.

Although the invention has been shown and described with respect to certain preferred examples, equivalents and modifications will occur to others skilled in the art upon the reading and understanding of the specification. The present invention includes all such equivalents and modifications and is limited only by the scope of the appended claims.

The invention claimed is:

1. A multi-layer frequency-selective surface, comprising:
a first layer comprising a first array of first metallic elements,
a second layer comprising a second array of second metallic elements, adjacent ones of the second metallic elements being distanced by gaps from each other, and
a third layer comprising a third array of third metallic elements,
wherein the second layer is arranged in-between and adjacent to the first layer and the third layer;
wherein the first array and third array comprise of a metallic filling fraction of at least 70% and the second array comprises of a metallic filling fraction of less than 15%;
wherein a frequency response of the multi-layer frequency-selective surface comprises at least one stop band and a passband offset from each other in frequency domain; and
wherein the second layer includes gaps in between adjacent ones of the second metallic elements configured to shift the frequency of the at least one stop band or the at least one passband without affecting the other.

2. The multi-layer frequency-selective surface of claim 1, wherein the at least one stop band is at higher frequencies than the passband.

3. The multi-layer frequency-selective surface of claim 1, wherein a metal filling fraction is lower for the second array than for the first array and the third array.

4. The multi-layer frequency-selective surface of claim 1, wherein the second metallic elements are loop-shaped.

5. The multi-layer frequency-selective surface of claim 1, wherein the second metallic elements are cross-shaped.

6. The multi-layer frequency-selective surface of claim 1, wherein the second array has a twofold rotational symmetry.

7. The multi-layer frequency-selective surface of claim 1,
wherein the gaps include first gaps and second gaps,
wherein the adjacent ones of the second metallic elements are distanced by the first gaps along a first in-plane direction of the second array,
wherein adjacent ones of the second metallic elements are distanced by the second gaps along a second in-plane direction of the second array, and
wherein the first gaps are wider than the second gaps.

8. The multi-layer frequency-selective surface of claim 1,
wherein adjacent ones of the second metallic elements are distanced by the gaps along a first in-plane direction of the second array,
wherein adjacent ones of the second metallic elements are joined together along a second in-plane direction of the second array.

9. The multi-layer frequency-selective surface of claim 1, further comprising:
tunable capacitors arranged in one or more of the gaps.

10. The multi-layer frequency-selective surface of claim 9, wherein the tunable capacitors comprise PIN diodes.

11. A system, comprising:
the multi-layer frequency-selective surface of claim 9,
a voltage source configured to apply a bias voltage to the tunable capacitors, and
a control unit configured to control the voltage source to apply the bias voltage based on control data indicative of a frequency of a stop band of a frequency response of the multi-layer frequency-selective surface.

12. The system of claim 11, wherein the voltage source is configured to apply the bias voltage to a series connection of multiple ones of the tunable capacitors.

13. A wireless communication device, comprising:
a cover,
an antenna configured to transmit or receive electromagnetic waves,
the multi-layer frequency-selective surface of claim 1 attached to the cover adjacent to the antenna.

14. A computer-implemented method, comprising:
obtaining control data indicative of a frequency of a stopband; and controlling a voltage source to bias tunable capacitors arranged in gaps between elements of an array of a frequency-selective surface;

wherein the array of a frequency-selective surface is a layer of a multi-layer frequency selective surface, wherein the multi-layer frequency selective surface comprises a frequency response of the multi-layer frequency-selective surface having the stopband and a passband offset from each other in frequency domain;

wherein the tunable capacitors are arranged in a series connection and are configured to shift the frequency of the stopband without affecting the frequency of a passband.

* * * * *